United States Patent
Vittimberga et al.

(10) Patent No.: US 10,380,476 B1
(45) Date of Patent: *Aug. 13, 2019

(54) TRANSACTION INSTRUMENT

(71) Applicant: Wells Fargo Bank, N.A., San Francisco, CA (US)

(72) Inventors: Paul Vittimberga, Oakland, CA (US); Kristine Ing Kushner, Orinda, CA (US); John Wright, Benicia, CA (US)

(73) Assignee: Wells Fargo Bank, N.A., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/299,825

(22) Filed: Oct. 21, 2016

Related U.S. Application Data

(63) Continuation-in-part of application No. 14/564,747, filed on Dec. 9, 2014.

(60) Provisional application No. 61/914,152, filed on Dec. 10, 2013.

(51) Int. Cl.
  *G06K 19/00* (2006.01)
  *G06K 19/077* (2006.01)
  *B32B 27/20* (2006.01)

(52) U.S. Cl.
  CPC ........ *G06K 19/07722* (2013.01); *B32B 27/20* (2013.01); *G06K 19/07749* (2013.01); *B32B 2307/7163* (2013.01); *B32B 2425/00* (2013.01)

(58) Field of Classification Search
  USPC .................. 235/435, 439, 454, 487, 492
  See application file for complete search history.

(56) References Cited

U.S. PATENT DOCUMENTS

| | | |
|---|---|---|
| 4,114,032 A | 9/1978 | Brosow et al. |
| 4,906,494 A | 3/1990 | Babinec et al. |
| 5,106,288 A | 4/1992 | Hughes |
| 5,120,589 A | 6/1992 | Morikawa et al. |
| 5,134,773 A | 8/1992 | LeMaire et al. |
| 5,236,637 A | 8/1993 | Hull |
| 5,434,917 A | 7/1995 | Naccache et al. |
| 5,602,381 A | 2/1997 | Hoshino et al. |
| 5,714,747 A | 2/1998 | West et al. |

(Continued)

FOREIGN PATENT DOCUMENTS

| | | |
|---|---|---|
| JP | H06103423 A | 4/1994 |
| KR | 20100000467 A | 1/2010 |

(Continued)

OTHER PUBLICATIONS

Waters, M., Cast vs. Calendered Vinyl, SIGNINDUSTRY.com, http://www.signindustry.com/vinyl/articles/2013-05-15-Avery-CastVsCalendered.php3, Jun. 9, 2015, pp. 1-3; all enclosed pages cited.

(Continued)

*Primary Examiner* — Matthew Mikels
(74) *Attorney, Agent, or Firm* — Shumaker & Sieffert, P.A.

(57) ABSTRACT

A transaction instrument comprising a metal-filled biodegradable polymer. The biodegradable polymer is a plant-based polymer, a protein-based polymer, or a combination thereof. The metal of the blended composite of metal and biodegradable polymer is a heavy-gravity compound. The transaction instrument is biodegradable in whole or in part. A method(s) for making a transaction instrument comprising a blended composite of metal and a biodegradable polymer is also provided.

20 Claims, 10 Drawing Sheets

(SINGLE LAYER CARD)

(56) References Cited

U.S. PATENT DOCUMENTS

| | | | |
|---|---|---|---|
| 6,104,311 | A | 8/2000 | Lastinger |
| 6,176,430 | B1 | 1/2001 | Finkelstein et al. |
| 6,221,296 | B1 | 4/2001 | James et al. |
| 6,364,982 | B1 | 4/2002 | Lynch et al. |
| 6,471,128 | B1 | 10/2002 | Corcoran et al. |
| 6,894,624 | B2 | 5/2005 | Kim et al. |
| 6,930,606 | B2 | 8/2005 | Crane et al. |
| 7,240,847 | B2 | 7/2007 | Püschner et al. |
| 7,241,537 | B2 | 7/2007 | Kaule |
| 7,494,057 | B2 | 2/2009 | Lasch et al. |
| 7,733,231 | B2 | 6/2010 | Carney et al. |
| 7,785,680 | B2 | 8/2010 | Brennan et al. |
| 7,892,474 | B2 | 2/2011 | Shkolnik et al. |
| 8,121,386 | B2 | 2/2012 | Rancien |
| 8,302,870 | B2 | 11/2012 | Paeschke et al. |
| 8,322,623 | B1 | 12/2012 | Mullen et al. |
| 8,383,329 | B2 | 2/2013 | Matsuda et al. |
| 8,523,062 | B2 | 9/2013 | Varga et al. |
| 9,016,591 | B2 | 4/2015 | Herslow et al. |
| 9,390,363 | B1 | 7/2016 | Herslow et al. |
| 2003/0131932 | A1 | 7/2003 | Hoult et al. |
| 2005/0035491 | A1 | 2/2005 | Bagnall et al. |
| 2005/0196604 | A1 | 9/2005 | Funicelli et al. |
| 2005/0277231 | A1 | 12/2005 | Hembree et al. |
| 2006/0074813 | A1* | 4/2006 | Saunders ............... G06Q 20/20 705/67 |
| 2006/0147742 | A1 | 7/2006 | Matsuda et al. |
| 2008/0063462 | A1 | 3/2008 | Steinschaden |
| 2009/0074231 | A1 | 3/2009 | Rancien |
| 2009/0184168 | A1* | 7/2009 | Ricketts ............... B32B 27/08 235/492 |
| 2010/0078489 | A1 | 4/2010 | Winkler |
| 2010/0096465 | A1 | 4/2010 | Stagg |
| 2010/0194093 | A1 | 8/2010 | MacPherson |
| 2011/0064388 | A1 | 3/2011 | Brown et al. |
| 2012/0055013 | A1 | 3/2012 | Finn |
| 2012/0125993 | A1 | 5/2012 | Thiele et al. |
| 2012/0153812 | A1 | 6/2012 | Aurongzeb et al. |
| 2013/0292862 | A1 | 11/2013 | Joyce |
| 2013/0295212 | A1 | 11/2013 | Chen et al. |
| 2013/0300101 | A1 | 11/2013 | Wicker et al. |
| 2013/0332353 | A1 | 12/2013 | Aidasani et al. |
| 2013/0334808 | A1 | 12/2013 | Hazen et al. |
| 2013/0335416 | A1 | 12/2013 | Coon et al. |
| 2014/0014715 | A1 | 1/2014 | Moran et al. |
| 2014/0076965 | A1 | 3/2014 | Becorest et al. |
| 2014/0117094 | A1 | 5/2014 | Workley et al. |
| 2014/0129354 | A1 | 5/2014 | Soon-Shiong |
| 2014/0273961 | A1 | 9/2014 | Narendra et al. |
| 2014/0344091 | A1 | 11/2014 | Krebs |
| 2014/0367894 | A1 | 12/2014 | Kramer et al. |
| 2014/0367957 | A1 | 12/2014 | Jordan |
| 2015/0041546 | A1* | 2/2015 | Herslow ............... G06K 19/02 235/492 |
| 2015/0042755 | A1 | 2/2015 | Wang |
| 2015/0045934 | A1 | 2/2015 | Kallenbach et al. |
| 2015/0087427 | A1 | 3/2015 | Wane |
| 2015/0088290 | A1 | 3/2015 | Ghosh |
| 2015/0095213 | A1 | 4/2015 | Paintin |
| 2015/0097315 | A1 | 4/2015 | DeSimone et al. |

FOREIGN PATENT DOCUMENTS

| | | | |
|---|---|---|---|
| KR | 20160066300 | A | 6/2016 |
| KR | 101653702 | B1 | 9/2016 |
| WO | 2009/084774 | A1 | 7/2009 |

OTHER PUBLICATIONS

Wikipedia, 3D printing, http://en.wikipedia.org/wiki/3D_printing, Oct. 29, 2013, pp. 1-8; all enclosed pages cited.

Leaverusch, Robert D., Article, Now They Want Plastics to Be Heavy?, Plastics Technology, 5 pages, (Jun. 2001); all enclosed pages cited.

Article, Metal 3D Printing, http://gpiprototype.com/services/metal-3d-printing.html, Jun. 9, 2015, pp. 1-3; all enclosed pages cited.

Smart Card Technology, The Smart Card Report (Eighth Edition), pp. 269-287 (2004), only first page available online; full article available for purchase at http://www.sciencedirect.com/science/article/pii/B9781856174176500121; all enclosed pages cited.

Launey, Maximilien E., Munch, Etienne, Alsem, Daan Hein, Saiz, Eduardo, Tomsia, Antoni P., and Ritchie, Robert O.; A novel biomimetic approach to the design of high-performance ceramic-metal composites; Journal of the Royal Society Interface; Oct. 14, 2009; pp. 741-753; published online; all enclosed pages cited.

Bourzac, Katherine; Ceramics That Won't Shatter; MIT Technology Review; Dec. 4, 2008; http://www.technologyreview.com/news/411301/ceramics-that-wont-shatter/page/2/; accessed on Nov. 20, 2014; all enclosed pages cited.

Technical Overview of Biopolymer Field; https://www.princeton.edu/~ota/disk1/1993/9313/931304.PDF; accessed Aug. 18, 2016; all enclosed pages cited.

Huisman, J., Stevel, A.L.N, Stobbe, I.; Eco-efficiency considerations on the end-of-life of consumer electronic products; IEEE Transactions on Electronics Packaging Manufacturing, v 27, n 1, p. 9-25; Jan. 2004; all enclosed pages cited.

Prosecution History from U.S. Appl. No. 14/564,757, dated Oct. 5, 2015 through Jan. 25, 2019, 101 pp.

\* cited by examiner (SINGLE LAYER CARD)

(SPLIT CORE)

(EXTRUSION)

(CALENDARING)

(IN-LINE LAMINATION)

TRANSACTION INSTRUMENT

CROSS-REFERENCE TO RELATED APPLICATIONS

This application is a continuation-in-part application that claims priority from U.S. patent application Ser. No. 14/564,747, filed Dec. 9, 2014, and from U.S. provisional patent application Ser. No. 61/914,152, filed on Dec. 10, 2013, in the United States Patent and Trademark Office. The disclosures of which are incorporated herein by reference in their entireties.

FIELD OF THE INVENTION

The present invention relates to a transaction instrument for use in a financial transaction, more particularly to a transaction instrument comprising a metal-filled biodegradable polymer.

BACKGROUND OF THE INVENTION

A vast number of financial transactions today involve a transaction card such as a credit card, debit card, stored-value card or automated teller machine (ATM) card. Such cards are typically comprised of plastic. However, a growing number of consumers desire to have a transaction card that has a status element to it such as a weightier card. As a result, a number of card issuers have attempted to manufacture such cards. Some cards have been made of all metal.

However, there are a number of disadvantages associated with such cards including the elevated costs associated with manufacturing and machining such cards and paying the manual labor costs associated with the manufacturing processes for such cards as well as difficulties in personalizing or embossing metal. Hence, there is a need to make an alternative card that satisfies this consumer need but also can be manufactured in a more efficient and cost effective manner.

Furthermore, responsiveness to environmental issues has become more important to consumer segments who use cards. Thus, there is also a need to provide a card that is environmentally friendly for consumers who are advocates of recycling and "green" products. Thus, the transaction instrument of the present invention addresses these unmet needs in the industry.

SUMMARY OF THE INVENTION

The present invention relates to a transaction instrument comprising a metal-filled biodegradable polymer. In an embodiment of the invention, the transaction instrument comprises a blended composite of metal and a biodegradable polymer as well as to a method(s) for making a transaction instrument comprising a blended composite of metal and a biodegradable polymer. In preferred embodiment of the invention, the metal of the blended composite of metal and biodegradable polymer is a heavy-gravity compound. In another embodiment of the invention, the transaction instrument is biodegradable in whole or in part.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, which are not necessarily to scale, wherein.

DETAILED DESCRIPTION OF THE INVENTION

Figure 1:
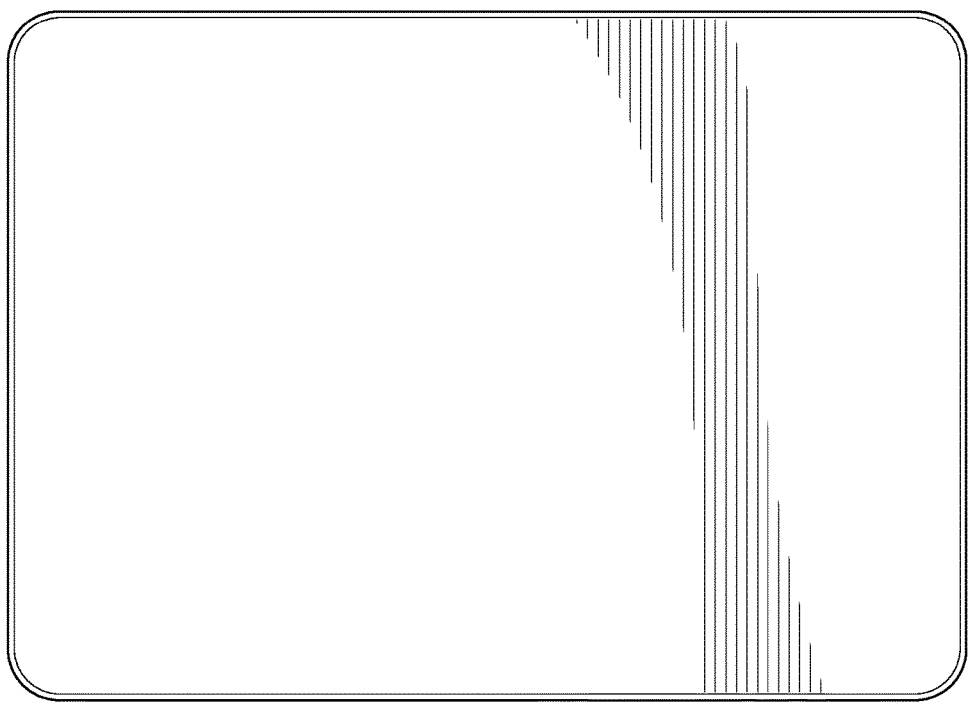
FIG. 1 illustrates a single layer transaction card of the present invention.

The following detailed description of the embodiment(s) is merely exemplary in nature and is in no way intended to limit the invention, its application, or uses.

The present invention relates to a transaction instrument for use in a financial transaction such as making a purchase or conducting another type of monetary transaction in commerce. Transaction instruments may take various forms including, but not limited to, cards such as a credit card, debit card, automatic-teller machine (ATM) card, check card, stored-value cards, gift cards, among others. Transaction instruments may be associated with various types of financial accounts such as a credit card account, debit card account, automatic-teller machine (ATM) account, direct deposit account, check, closed loop gift card account, open loop gift card account, or a combination thereof. A transaction instrument may be in the form of an electronic device. Examples of electronic devices include, but are not limited to, fob, ring, watch, wrist band, bracelet, other electronic jewelry, and hand-held devices.

In an embodiment of the invention, the transaction instrument is biodegradable in whole or in part.

In an embodiment of the invention, the transaction instrument comprises a biodegradable polymer.

In an embodiment of the present invention, the transaction instrument comprises a blended composite of metal and biodegradable polymer.

The term "metal", as used herein, includes, but is not limited to, metallic elements, metal-containing compounds, other metal forms, or a combination thereof. Preferred metals for use in the blended composite include, but are not limited to, tungsten, silver, zinc, bismuth, molybdenum, iron, steel, tin, copper, titanium, titanium dioxide, calcium carbonate, barium sulfate, nickel, aluminum, and a combination thereof.

In an embodiment of the invention, the metal is a high-gravity compound (HGC). High-gravity compounds have 40% to 96% by weight of a mineral filler or a metal powder.

High-gravity compounds have densities up to 15 g/cc. High-gravity compounds have a specific gravity (SG) typically in a range of 1.7 to 20. High-gravity compounds are commercially available from suppliers such as LNP Engineering Plastics, RTP Co., GE Plastics, and PolyOne Corp.

High-gravity compounds are generally classified according to SG levels although the upper range of the high-gravity compounds varies somewhat by supplier. High-gravity compounds are generally classified in the industry as light, middle and heavy. Light has a typical specific gravity range of 1.7 to 4. Middle has a typical specific gravity range of 4 to 7. Heavy has a typical specific gravity range of 7 to 20.

High-gravity compounds having a specific gravity in the light range typically use mineral fillers. Examples of high-gravity compounds having a specific gravity in the light range are calcium carbonate (2.6 SG), talc (2.7 SG), and barium sulfate (4.5 SG). Middle- and heavyweight high-gravity compounds typically require more dense metal fillers like steel, aluminum and tungsten. High-gravity compounds compare in weight to other metals such as aluminum, zinc, steel, and lead-antimony.

High-gravity compounds that may be particularly suitable for use in the present invention include, but are not limited to, tungsten, titanium dioxide, calcium carbonate, carbon, barium sulfate, steel, nickel, copper, aluminum, and a combination thereof.

A "biodegradable polymer" is generally defined as a polymer derived from biomass products, from microorganisms, from biotechnology, and/or from petrochemical products.

Examples of biodegradable polymers that are biomass products from agro-resources (agro-polymers) include, but are not limited to, polysaccharides (such as starches, lignocellulosic products, pectins, chitosan/chitin, and gums) and proteins/lipids (such as animals and plants).

Examples of biodegradable polymers from microorganisms include, but are not limited to, polyHydroxyalkanoates (PHA).

Examples of biodegradable polymers from bio-derived monomers include, but are not limited to, polylactides (such as polylactic acid (PLA)).

In a preferred embodiment of the invention, the biodegradable polymers include, but are not limited to, plant-based and/or protein-based polymers and co-polymers.

Examples of preferred plant-based and/or protein-based polymers and co-polymers include, but are not limited to, starch-based polymers, cellulose-based biopolymers, polylactic acid (PLA), polylactic acid-polyglycolic acid (PLA-PGA), polyhydroxyalkanoates (PHA), polyhydroxybutyrate (PHB), polyhydroxy valerate (PHV), and polyhydroxy hexanoate (PHH).

In another embodiment of the invention, a starch-based polymer can be combined with a resin for stability.

Cellulose-based biopolymers, including carboxymethylcellulose, can be combined with various biodegradable fibers and metal particles. Chitin or a chitin and cellulose composite has potentially favorable water repellent and strength properties. Chitosan has favorable ionic properties which could help it bind with metal particles, and may also have favorable antibacterial properties. Another example of protein-based polymers includes, but is not limited to, protein-based bioceramics.

In an aspect of the invention, the metal has a higher specific gravity than the biodegradable polymer alone. In another aspect of the invention, the blended composite has a lower specific gravity than the biodegradable polymer alone.

In another aspect of the invention, the metal of the blended composite has a weight in a range of 40% to 96% of the total blended composite weight. The metal of the blended composite has a volume in a range of 5% to 70% of the total blended composite volume. In a preferred aspect of the invention, the transaction instrument has a total weight in a range of 10 grams to 25 grams.

In an aspect of the present invention, the transaction card is compliant with at least a portion of ISO 7810, ISO 7811, or ISO 7816.

In another aspect of the invention, the transaction card has a surface finish in a range of 0.15 micrometers to 0.40 micrometers.

The transaction instrument of the present invention can be constructed in a number of configurations when in the form of a card. The transaction card has at least two sides. As a feature of the invention, the transaction card has a layer on one or both sides having an indicium indicative of an account associated with the transaction card. The indicium can be provided by at least one personalization process. Examples of personalization processes include, but are not limited to, dye sublimation printing, screen printing, gravure printing, lithography, inkjet printing, laser printing, indentation, additive manufacturing, or a combination thereof. In an aspect of the invention, wherein the indicium is provided free from milling or laser etching.

The transaction instrument of the present invention can be constructed in a number of configurations when in the form of a card. In one such configuration, the transaction card is a single-layer card comprised of a metal-filled biodegradable polymer. Preferably, the metal-filled biodegradable polymer comprises a high-gravity compound. FIG. 1 illustrates a single layer transaction card in accordance with aspects of the present invention. The single layer card is formed of the biodegradable polymer and typically has a thickness of about 30 mils with a tolerance of plus or minus 3 mils. However, it is contemplated and within the scope of the present invention that the thickness may vary. The transaction card may be embossed, laser etched, or machined.

Figure 2:
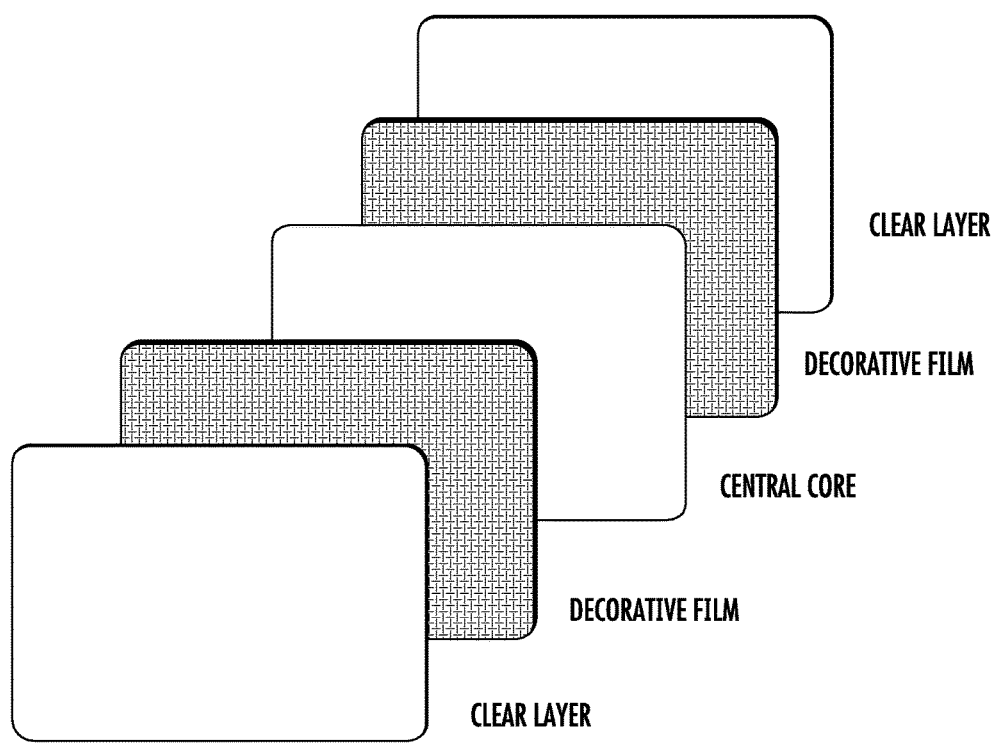
FIG. 2 illustrates a multi-layer transaction card of the present invention.

In another configuration, the transaction instrument of the present invention is a multi-layer card. FIG. 2 illustrates a multi-layer transaction card in accordance with aspects of the present invention. As shown in FIG. 2, the multi-layer card has a central core layer. The central core layer is comprised of a biodegradable polymer. The metal is preferably a high-gravity compound. The central core layer has a thickness in a range of about 25 mils to 30 mils. A decorative film layer may be present on the front and back surfaces of the central core layer to sandwich the central core layer. The decorative film layer is about 1 mil in thickness but thickness may vary. A clear layer(s) may be present on one or more of the decorative film layers, particularly on the side of the decorative layer that opposes the central core layer. A clear layer is typically about 1 mil in thickness but thickness may vary. Paint may be applied to any surface, including the core, decorative film, or clear film layer.

As a feature of the transaction instrument, the card is comprised of one or more layers of a waterproof film. The protective waterproofing is applied to portions of the transaction instrument that are not waterproof including, but not limited to, edges.

In another feature, the card is comprised of one of more layers of the blended composite of metal and polymer with inclusion of one or more layers containing polymer only. For example, there may be a designated location to accommodate a recess to be created through a subtractive manufacturing process wherein the designated location consists of polymer and not blended metal and polymer. In yet another feature, the card is comprised of one of more layers of the blended composite of metal and polymer with inclusion of one or more clear protective layers.

Figure 3:
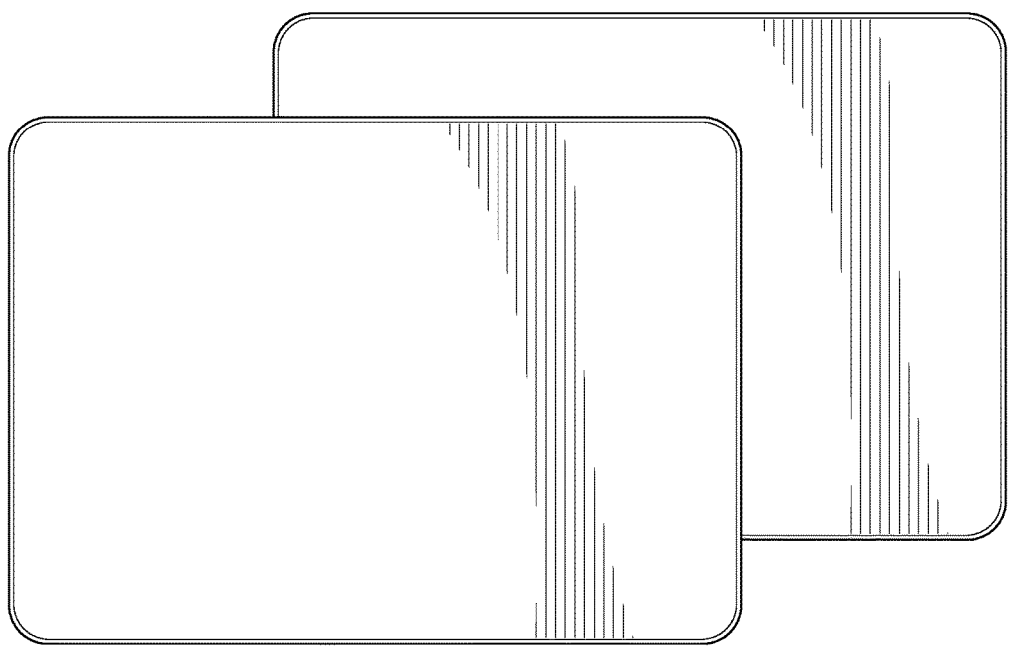
FIG. 3 illustrates a split core of a transaction card of the present invention.

In another possible configuration, the central core layer is a split core. FIG. 3 illustrates a split core of a transaction card in accordance with aspects of the present invention. As shown in FIG. 3, the central core layer is split into two layers as opposed to one. In this possible configuration, the card is comprised of at least two layers of the blended composite of metal and polymer. For example, each layer is in a range of about 2 mils to 15 mils. Among the advantages of the split core is easier processing. For example, it is easier to print on the front and back of each of the two layers and then laminate or otherwise join the layers back to back rather than printing on both sides of a single layer. In accordance with the present invention, one or more layers of the split core comprises a metal-filled biodegradable polymer.

Figure 4:
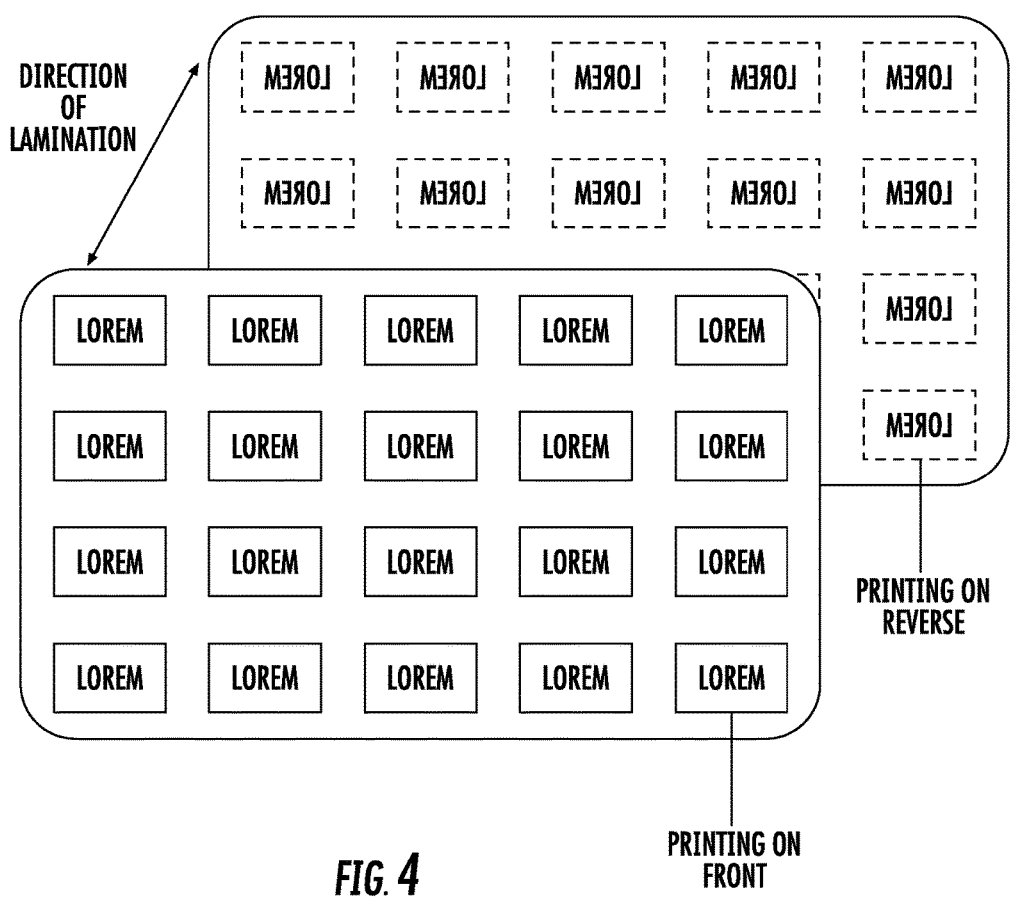
FIG. 4 illustrates another example of a split core of a transaction card of the present invention.

FIG. 4 illustrates printing on the front of a first layer and on the reverse of a second layer and joining the layers in the direction of lamination. Laminating of the layers occurs back to back after having been printed already. In accordance with the present invention, one or more layers of the split core comprise a blended composite of polymer and metal.

In another aspect of the present invention, the transaction card comprises a recess. The recess may comprise a component or inset device. The inset device may comprise one or more conducting contact pads. The contact pads are preferably located as set forth in ISO 7816. Examples of one or more components or inset devices include, but are not limited to, a chip such as a Europay-Mastercard-Visa (EMV) chip, a contactless antenna, a contactless antenna chip, a magnetic strip, an in-laid decoration, embedded features, and printed features. The recess has a size and a shape to accommodate the component or inset device. In an aspect of the invention, the recess has a depth in a range of 15 mils to 25 mils at the deepest point. In another aspect of the invention, the recess may consist of plastic and not blended metal and plastic.

In another feature of the invention, the transaction card is enabled to perform a financial transaction by inclusion of a machine readable indicium. The machine readable indicium may comprise a recess to accommodate, for example, a magnetic stripe. The recess is a minimum of 3.8 mm (0.15 inches) and a maximum of 16.5 mm (0.65 inches) from a longer edge of the card.

The metal-filled plant based polymer and/or protein-based polymer layer(s) of the transaction instrument of the present invention can be made by a number of methods of manufacture. In a preferred embodiment of the present invention, the transaction instrument is made by lamination of layers with one or more layers comprising a metal-filled plant-based polymer and/or protein-based polymer. In a preferred aspect of the present invention, the metal filled plant-based polymer and/or protein based polymer comprises a high-gravity compound. A layer may comprise in whole or in part of a metal-filled plant-based polymer and/or protein based polymer and, in the case of a single layer, may be the entire thickness of the instrument.

Among the methods of making a plant-based polymer and/or protein based polymer layer include, but are not limited to, extrusion, calendaring, casting, blowing or blow molding, injection molding, and additive manufacturing.

Figure 5:
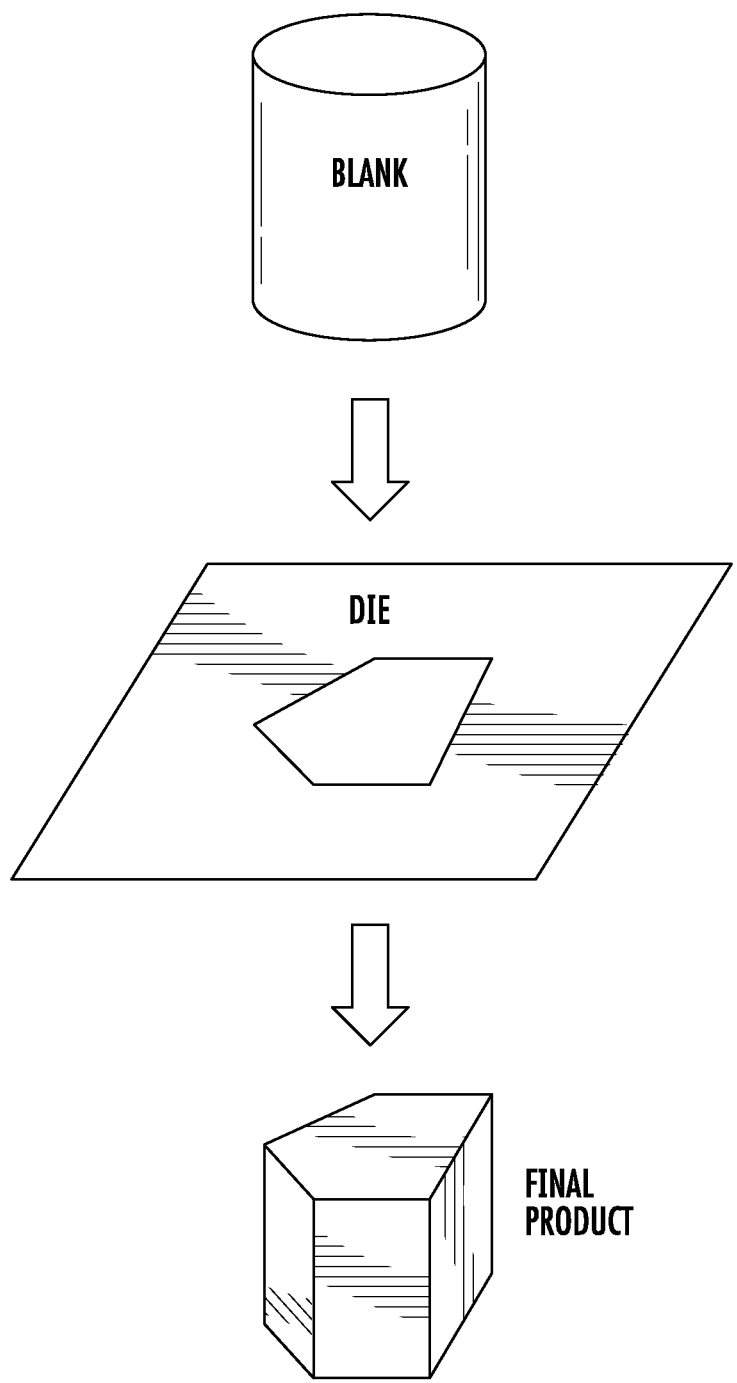
FIG. 5 illustrates an extrusion process.

One such process is extrusion. An example of a method of making a transaction instrument of the present invention by an extrusion process is shown in FIG. 5. An extruded film layer can be formed by an extrusion process. Extrusion is a process whereby a plant-based polymer and/or protein-based polymer material is inserted or forced through a die having a particular shape. This process can be used to create one or more plant-based polymer and/or protein-based polymer layers.

Figure 6:
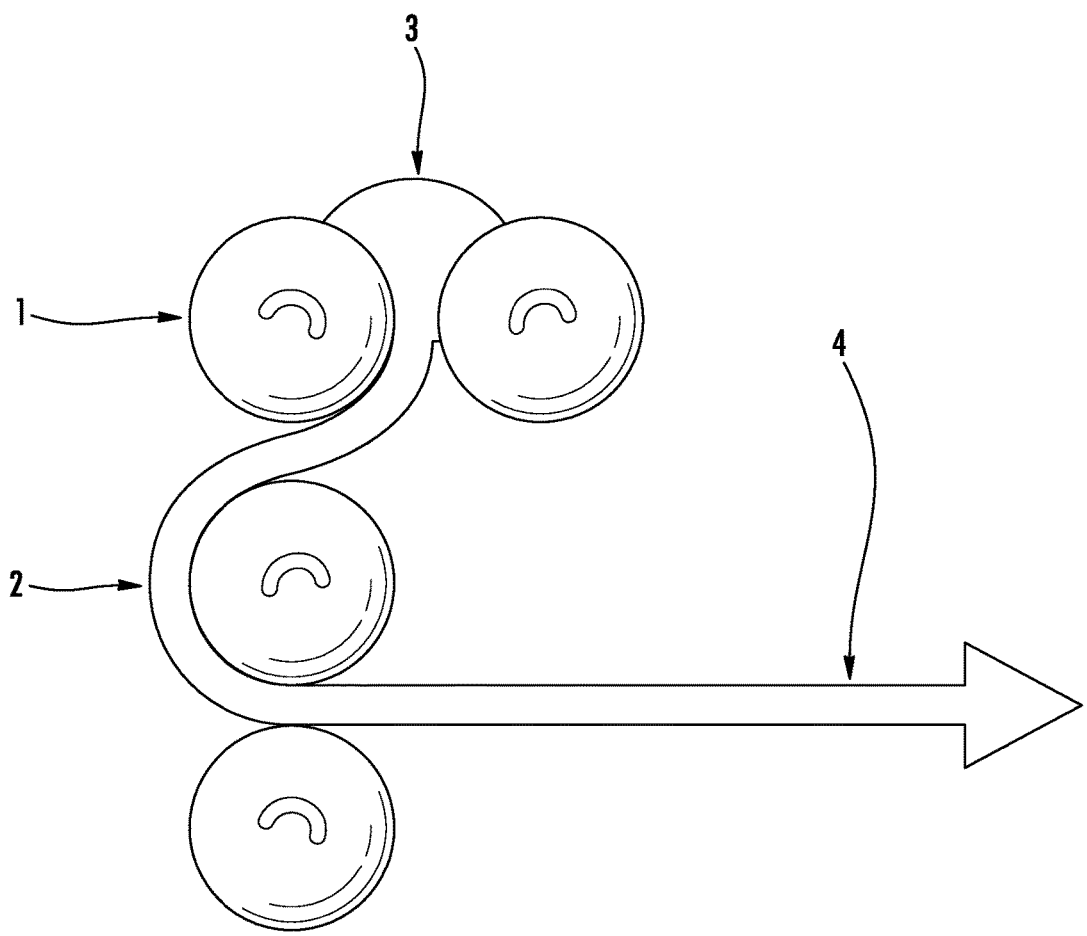
FIG. 6 illustrates a calendaring process.

Another process that may be used to make the transaction instrument of the present invention is calendaring. An example of a method of making a transaction instrument of the present invention by a calendaring process is shown in FIG. 6. Calendaring is used to make a calendared film. A calendar is a series of hard pressure rollers used to form or smooth a sheet of material such as paper or plant-based polymer and/or protein-based polymer film. The process begins with the ingredients being mixed, heated and then extruded through a pair of counter-rotating rollers. Additional rollers can be used to further shape or thin the sheet. An embossing station can impart different patterns or levels of gloss to the extruded material. Finally, the film is cooled before being cut into sheets if more rigid, or spooled onto rolls if sufficiently flexible. The material used for the transaction instrument is relatively rigid and would most likely be cut into sheets.

Another method of making the transaction instrument of the present invention is casting. Casting produces cast film. The process begins with the ingredients being mixed and then extruded onto a moving web known as the casting sheet. Ingredients are likely to be liquid or more melted than those at the start of a calendaring process. Unlike calendaring, the material is not itself pulled through rollers, and any dimensional stress is borne by the casting sheet. Since the film has not had any stress applied during the manufacturing process it does not try to resume or shrink back to its original form. Casting may provide an advantage over calendared films which generally shrink a minimum of 2-3% over time. Casting allows the film to be very thin and while it is possible to make sheets as thin as 2 mil or less either calendaring or casting, there may be greater uniformity and ease of manufacturing with casting.

In another aspect of the method of making the transaction instrument of the present invention, the transaction instrument manufacturing process may employ extrusion. Extruded, calendared, or cast film can employ extrusion, which is the simultaneous production of two or more materials to form a multi-layered film. Co-extrusion can include the manufacturing of different types of layers with different properties. For example, the heavy core of the instrument can be sandwiched between colorful surface layers or clear protection.

Another method of making the transaction instrument of the present invention is blown film extrusion. Blown film extrusion is a common method to make film. The process involves extruding a tube of molten polymer through a die and inflating to several times its initial diameter to form a thin film bubble. The bubble is then collapsed and used as a lay-flat film.

Another method of making the transaction instrument of the present invention is injection molding. Injection molding may be stand-alone or around components. Components around which injection molding may occur include, but are not limited to, a chip such as an ME chip, an EMV chip, an NFC enabled chip, a contactless antenna, a magnetic strip or other components. In the case of stand-alone injection molding, spaces may be allowed for the insertion of devices such as a package containing a computer chip and contacts or a magnetic strip.

Another method of making the transaction instrument of the present invention is additive manufacturing.

The transaction instrument of the present invention has special features. One such feature is a split core as illustrated in FIGS. 3 and 4. A core of an instrument that is not split must be turned over to be printed and finished on the other side as part of the instrument or card manufacturing process. This is less efficient. Furthermore, by making two heavy biodegradable polymer core halves that can be processed separately and then laminated together, the cost in the manufacturing process is reduced. Waste can also be reduced since turning over a single core leads to higher damage and defective product that is discarded.

In accordance with a method of the present invention, the method comprises providing at least two layers with each layer having a front side and a back side, wherein at least one of the two layers comprises a blended composite of a metal and a biodegradable polymer, printing on a front side of at least one layer, and joining together the back sides in direct contact with each other or with one or more intermediate layers. A layer may be in a range of 2 mils to 15 mils in thickness. One or more layers may be extruded, calendared, cast, injected molded, or a combination thereof.

Figure 7:
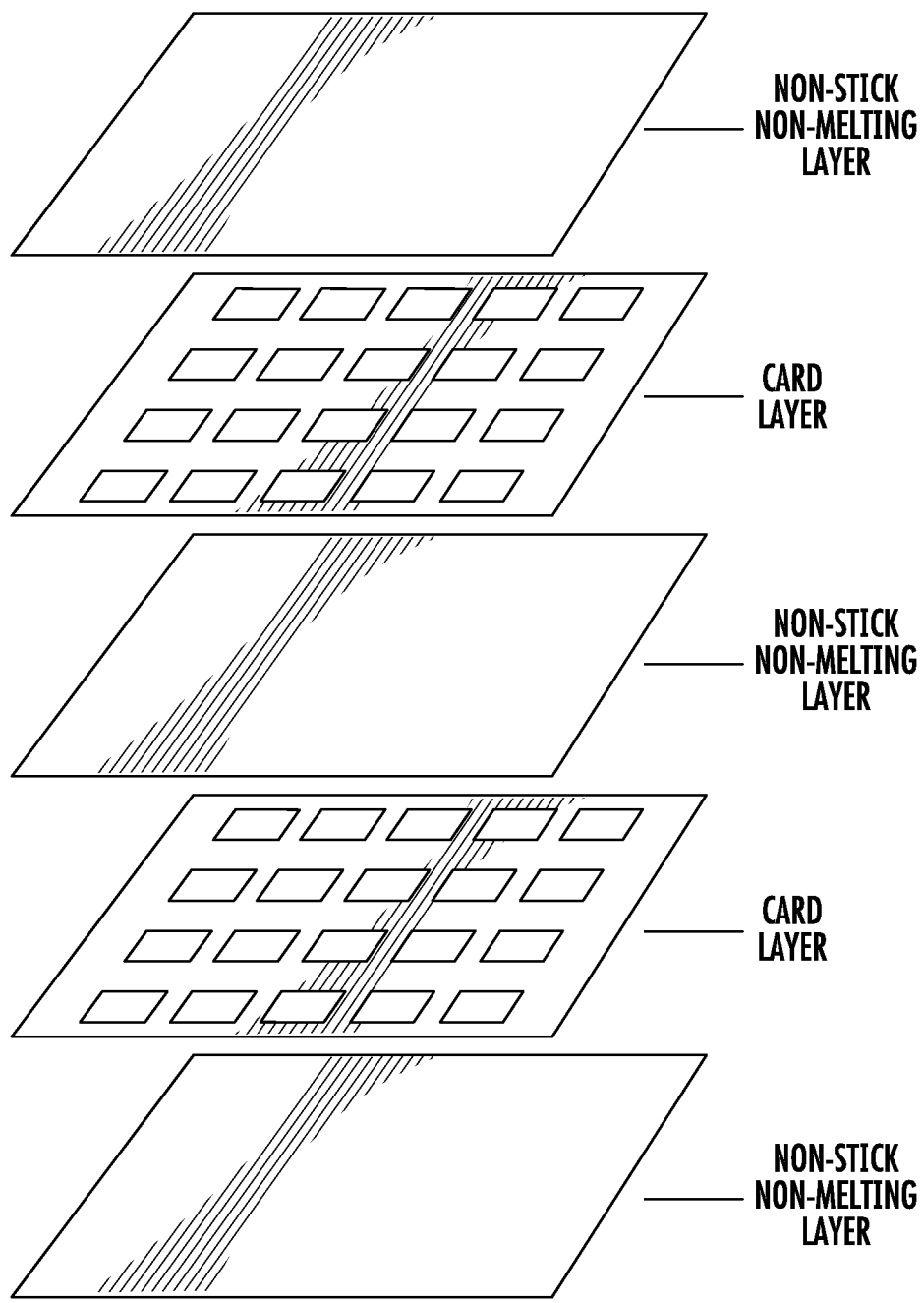
FIG. 7 illustrates a multi-layer card stack in accordance with aspects of the present invention.
Figure 8:
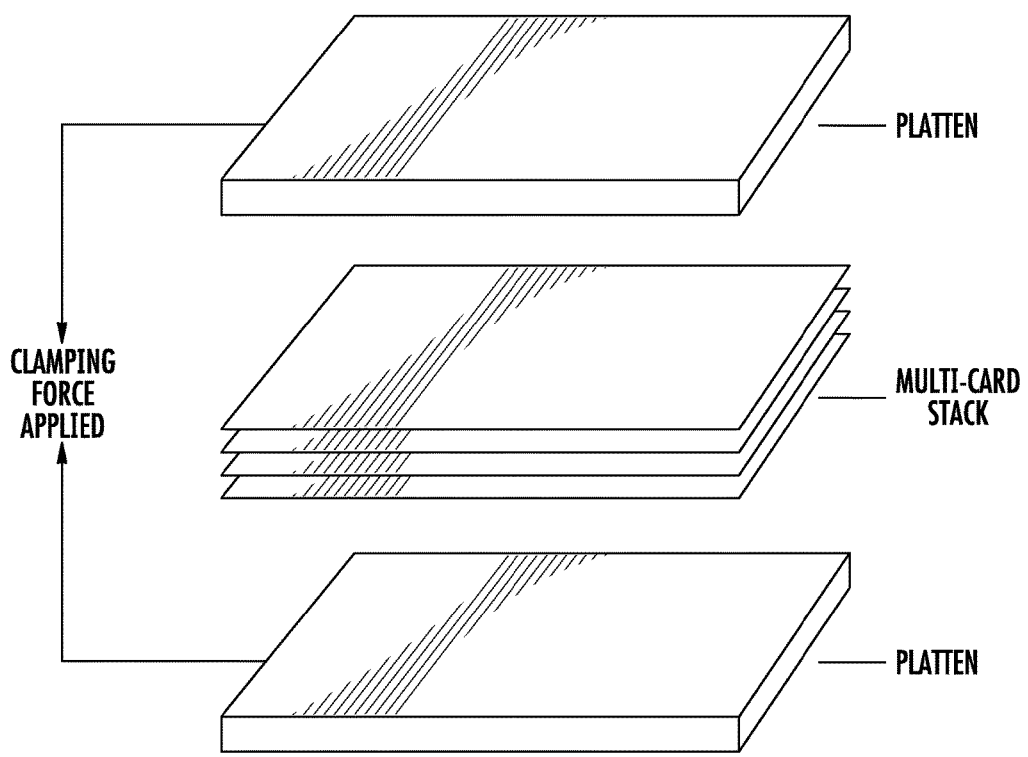
FIG. 8 illustrates a device for applying a clamping force to a multi-layer card stack between two plattens in preparation for oven lamination.
Figure 9:
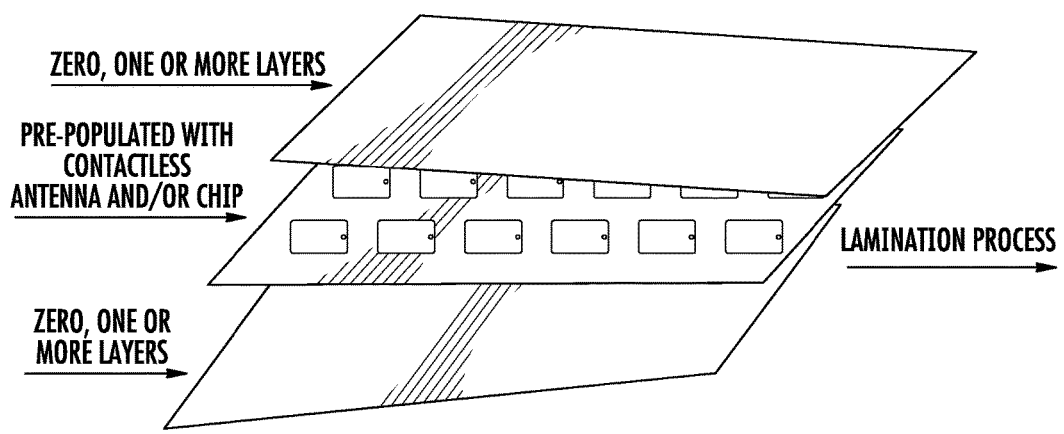
FIG. 9 illustrates a card layer pre-populated with contactless antenna and/or chip and next to or between zero, one or more layers to proceed to a lamination process.
Figure 10:
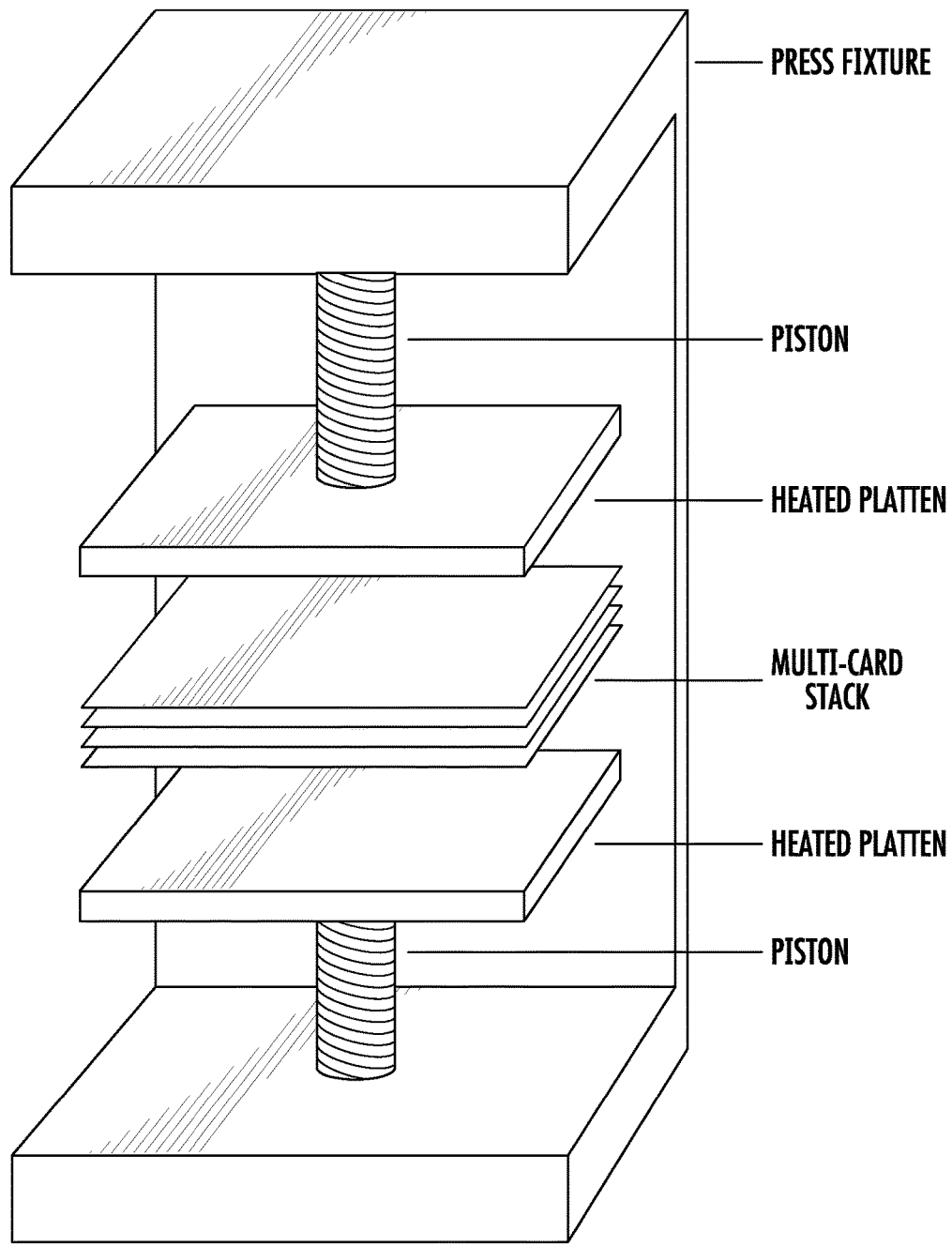
FIG. 10 illustrates a method of making a transaction instrument of the present invention using a device with heated plattens.

In still another aspect of the method of making the transaction instrument of the present invention, the manufacturing process may employ in-line lamination. As shown in FIG. 7, the multi-layer card stack may be comprised of a card layer(s) sandwiched between one or more non-stick, non-melting layer(s). FIG. 8 illustrates a device for applying a clamping force to a multi-layer card stack between two platens in preparation for oven lamination. FIG. 9 illustrates a card layer pre-populated with contactless antenna and/or chip and next to or between zero, one or more layers to proceed to a lamination process. Similar to co-extrusion, an extruded, calendared, or cast film can be laminated in-line with finished layers such as foils, decorative printed sheets, or protective layers. In-line lamination may also include sheets containing contactless antenna and chip packages. The lamination may comprise hot lamination. The lamination may be free from cold rolling. FIG. 10 illustrates a method of making a transaction instrument of the present invention using a device with heated platens as opposed to undergoing oven lamination. A press fixture having pistons and heated platens is used to laminate the multi-card stack. Lamination may occur in ambient air or under vacuum. A vacuum can be used to eliminate bubbles during lamination.

In another embodiment of the method of making the transaction instrument of the present invention, the manufacturing process may employ lamination in a temperature controlled oven. An example of a method of making the transaction instrument of the present invention in a temperature controlled oven is shown in FIG. 7. Layers of card material, typically with multiple cards on a sheet, are placed between metal plates and clamped together under pressure. There may be multiple sheets with non-meltable separators in one stack. The plates with sheets in the middle are then placed in an oven where the temperature and time is closely controlled so as to produce layers that are well adhered to each other but not overly melted, burnt or otherwise damaged through-overheating. Alternatively, one or more sheets with or without metal plates pre-affixed may be pressed between hot plates at a specified pressure and temperature for a specified time.

Thus, there are a number of advantages associated with the transaction instrument comprising a blended composite of metal and a biodegradable polymer. Among the advantages is that metal-filled biodegradable polymers offer superior weight. They also provide manufacturing cost advantages as compared to metal cards which have high machining and manual labor costs. They also may be personalized through embossing, unlike a more rigid metal card. More importantly, the transaction instrument comprising a blended composite of metal and a biodegradable polymer are preferably biodegradable, in whole or in part, and offer an environmentally friendly option to traditional non-biodegradable polymers. Bioceramics may have the high strength of a ceramic in conjunction with reduced brittleness. The enhanced biodegradability of the biodegradable polymers may also aid in the recovery/potential recycling of the metals that were blended with biodegradable polymer.

Furthermore, a card comprised of a biodegradable polymer has a number of environmental advantages including, but not limited to, being potentially non-toxic, biodegrades faster and into substances that are less toxic, easier to recycle, requires less fossil fuel to manufacture, and are renewable.

It is contemplated and within the scope of the present invention that the transaction cards of the present invention can be used for other applications beyond mere financial transactions. For example, the transaction cards of the present invention may be used as include loyalty/affinity cards such as those used by casinos and airlines or other industries; hotel rooms or other key cards as well as items like security badges.

There are numerous features associated with the transaction card of the present invention. For example, the transaction card may comprise a chip such as an EMV chip and/or NFC enabled chip, a recess for an antenna and/or wires, and a magnetic strip, among other features. The transaction card may have varying colors, logos and images and decorative features such as inlaid decoration, various textures, personalization, and braille. Likewise, the transaction card may vary in shape, size or orientation.

It will therefore be readily understood by those persons skilled in the art that the present invention is susceptible of broad utility and application. Many embodiments and adaptations of the present invention other than those herein described, as well as many variations, modifications and equivalent arrangements, will be apparent from or reasonably suggested by the present invention and the foregoing description thereof, without departing from the substance or scope of the present invention. Accordingly, while the present invention has been described herein in detail in relation to its preferred embodiment, it is to be understood that this disclosure is only illustrative and exemplary of the present invention and is made merely for purposes of providing a full and enabling disclosure of the invention. The foregoing disclosure is not intended or to be construed to limit the present invention or otherwise to exclude any such other embodiments, adaptations, variations, modifications and equivalent arrangements.

What is claimed is:

1. A transaction instrument comprising a blended composite of metal and a biodegradable polymer selected from the group consisting of polylactic acid-polyglycolic acid (PLA-PGA), polyhydroxybutyrate (PHB), polyhydroxy valerate (PHV), polyhydroxy hexanoale (PHH), a cellulose-based biopolymer, carboxymethylcellulose, chitin, a chitin and cellulose composite, chitosan, a protein-based polymer, a protein-based bioceramic, and a combination thereof, wherein the transaction instrument has a total weight in a range of 10 grams to 25 grams, wherein the metal is a high-gravity compound selected from the group consisting of tungsten, silver, zinc, bismuth, molybdenum, iron, steel, tin, copper, titanium, barium sulfate, nickel, aluminum, and a combination thereof, and wherein the metal of the blended composite has a weight in a range from greater than 50% to 96% of the total blended composite weight.

2. The transaction instrument according to claim 1, wherein the biodegradable polymer is selected from the group consisting of cellulose-based biopolymers, carboxymethylcellulose, chitin, chitin and cellulose composite, chitosan, protein-based bioceramics, and a combination thereof.

3. The transaction instrument according to claim 1, wherein the high-gravity compound has a specific gravity in a range of 7 to 20.

4. The transaction instrument according to claim 1, wherein the transaction instrument is biodegradable in whole or in part.

5. The transaction instrument according to claim 1, wherein the transaction instrument is in a form of a card.

6. The transaction instrument according to claim 5, wherein the card is comprised of one of more layers including a central core.

7. The transaction instrument according to claim 6, wherein the central core comprises the blended composite.

8. The transaction instrument according to claim 5, wherein the one or more layers comprises at least one layer consisting essentially of a polymer.

9. The transaction instrument according to claim 5, wherein the one of more layers comprises at least one of one or more graphics layers, one or more clear protective layers, or a combination thereof.

10. The transaction instrument according to claim 5, further comprising a recess configured to receive an inset device.

11. The transaction instrument according to claim 10, wherein the inset device comprises at least one of an integrated circuit, an EMV chip, NFC chip, a magnetic strip, or conducting contact pads.

12. A method of making a transaction card, the method comprising:

providing two or more layers with each layer having a front side and a back side, wherein at least one of the two or more layers comprises a blended composite of a metal and a biodegradable polymer selected from the group consisting of polylactic acid-polyglycolic acid (PLA-PGA), polyhydroxybutyrate (PHB), polyhydroxy valerate (PHV), polyhydroxy hexanoale (PHH), a cellulose-based biopolymer, carboxymethylcellulose, chitin, a chitin and cellulose composite, chitosan, a protein-based polymer, a protein-based bioceramic, and a combination thereof, printing on a front side of at least one layer, and joining together the back sides in direct contact with each other or with one or more intermediate layers, wherein the transaction instrument has a total weight in a range of 10 grams to 25 grams, wherein the metal is a high-gravity compound selected from the group consisting of tungsten, silver, zinc, bismuth, molybdenum, iron, steel, tin, copper, titanium, barium sulfate, nickel, aluminum, and a combination thereof, and wherein the metal of the blended composite has a weight within a range from greater than 50% to 96% of the total blended composite weight.

13. The method according to claim 12, wherein one of the layers comprises an antenna.

14. The method according to claim 12, further comprising using subtractive manufacturing to form a recess having an appropriate size and shape to accommodate an inset device.

15. A transaction card made according to the method of claim 12.

16. A transaction instrument comprising:

a blended composite of metal and a biodegradable polymer selected from the group consisting of polylactic acid-polyglycolic acid (PLA-PGA), polyhydroxybutyrate (PHB), polyhydroxy valerate (PHV), polyhydroxy hexanoale (PHH), a cellulose-based biopolymer, carboxymethylcellulose, chitin, a chitin and cellulose composite, chitosan, a protein-based polymer, a protein-based bioceramic, and a combination thereof, wherein the metal is a high-gravity compound having a specific gravity of 7 to 20.

17. The transaction instrument according to claim 16, wherein the metal of the blended composite has a weight within a range from greater than 50% to 96% of the total blended composite weight.

18. The transaction instrument according to claim 16, wherein the biodegradable polymer is selected from the group consisting of cellulose-based biopolymers, carboxymethylcellulose, chitin, chitin and cellulose composite, chitosan, protein-based bioceramics, and a combination thereof.

19. The transaction instrument of claim 1, wherein the biodegradable polymer comprises chitin or chitosan.

20. The transaction instrument of claim 16, wherein the biodegradable polymer comprises chitin or chitosan.

* * * * *